(12) United States Patent
Taylor et al.

(10) Patent No.: US 7,888,818 B2
(45) Date of Patent: Feb. 15, 2011

(54) SUBSTATION BASED HIGH VOLTAGE UNINTERRUPTIBLE POWER SUPPLY

(75) Inventors: Paul Taylor, Westerville, OH (US); James K. Martin, Galena, OH (US)

(73) Assignee: Liebert Corporation, Columbus, OH (US)

( * ) Notice: Subject to any disclaimer, the term of this patent is extended or adjusted under 35 U.S.C. 154(b) by 185 days.

(21) Appl. No.: 12/388,053

(22) Filed: Feb. 18, 2009

(65) Prior Publication Data

US 2009/0212631 A1  Aug. 27, 2009

Related U.S. Application Data

(60) Provisional application No. 61/030,608, filed on Feb. 22, 2008.

(51) Int. Cl.
  *H02J 9/06* (2006.01)
(52) U.S. Cl. ......................................................... 307/64
(58) Field of Classification Search ............. 307/64–66, 307/17
  See application file for complete search history.

(56) References Cited

U.S. PATENT DOCUMENTS

| | | | |
|---|---|---|---|
| 4,748,341 A | | 5/1988 | Gupta |
| 5,206,539 A | | 4/1993 | Kammeter |
| 5,289,046 A | * | 2/1994 | Gregorich et al. ............. 307/66 |
| 5,343,079 A | | 8/1994 | Mohan et al. |
| 5,343,080 A | | 8/1994 | Kammeter |
| 5,434,455 A | | 7/1995 | Kammeter |
| 5,477,091 A | | 12/1995 | Fiorina et al. |
| 5,521,811 A | | 5/1996 | Levran et al. |
| 5,656,924 A | | 8/1997 | Mohan et al. |
| 5,764,504 A | | 6/1998 | Brand et al. |
| 5,781,422 A | * | 7/1998 | Lavin et al. ................... 363/37 |
| 5,790,356 A | | 8/1998 | Bottrell et al. |

(Continued)

FOREIGN PATENT DOCUMENTS

EP  1006641  6/2000

(Continued)

OTHER PUBLICATIONS

Line Current Harmonics Reduction in Multipulse Connection of Asymmetrically Loaded Rectifiers; C. Rech and J.R. Pinheiro (2005), *IEEE Transactions on Industrial Electronics*.

(Continued)

*Primary Examiner*—Albert W Paladini
(74) *Attorney, Agent, or Firm*—Harness, Dickey & Pierce, P.L.C.

(57) ABSTRACT

A power supply includes an isolation transformer. The isolation transformer includes a primary winding and N secondary windings, where N is an integer. The primary winding receives a first alternating current voltage. Each of the N secondary windings generates a second alternating current voltage. M rectifiers convert the second alternating current voltages to a direct current voltage, where M is an integer. X inverters convert the direct current voltage to a third alternating current voltage, where X is an integer. A reference transformer is electrically coupled between the X inverters and output terminals of the power supply, is connected in parallel with the output terminals, and is configured to provide at least one of a neutral reference and a ground reference.

13 Claims, 9 Drawing Sheets

U.S. PATENT DOCUMENTS

| | | | |
|---|---|---|---|
| 5,883,796 A | 3/1999 | Cheng et al. | |
| 5,982,645 A | 11/1999 | Levran et al. | |
| 6,404,075 B1 | 6/2002 | Potter et al. | |
| 6,411,910 B1 | 6/2002 | Eulau et al. | |
| 6,624,532 B1 | 9/2003 | Davidow et al. | |
| 6,879,053 B1 | 4/2005 | Welches et al. | |
| 7,141,894 B2 | 11/2006 | Kraus | |
| 7,190,090 B2 * | 3/2007 | Shi | 307/18 |
| 7,372,177 B2 * | 5/2008 | Colombi et al. | 307/64 |
| 7,705,488 B2 * | 4/2010 | Clemo et al. | 307/64 |
| 2003/0225481 A1 | 12/2003 | Sealing et al. | |

FOREIGN PATENT DOCUMENTS

| | | |
|---|---|---|
| JP | 63253833 | 10/1988 |
| WO | WO-0161824 | 8/2001 |
| WO | WO-03073177 | 9/2003 |
| WO | WO-03073224 | 9/2003 |
| WO | WO-2007055587 | 5/2007 |
| WO | WO-2007064265 | 6/2007 |

OTHER PUBLICATIONS

High Performance Power Converter Systems for Nonlinear and Unbalanced Load/Source; Richard Zhang (1998), "High Performance Power Converter Systems for Nonlinear and Unbalanced Load/Source", *Virginia Polytechnic Instutute and State University*.

* cited by examiner

US 7,888,818 B2

SUBSTATION BASED HIGH VOLTAGE UNINTERRUPTIBLE POWER SUPPLY

CROSS-REFERENCE TO RELATED APPLICATIONS

This application claims the benefit of U.S. Provisional Application No. 61/030,608, filed on Feb. 22, 2008. The disclosure of the above application is incorporated herein by reference in its entirety.

FIELD

The present disclosure relates generally to uninterruptible power supplies, and more particularly to a high power uninterruptible power supply.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High power uninterruptible power supplies are used in supplying power to a facility, or areas of a facility. A high power uninterruptible power supply ("UPS") may have a one mega-volt-amp (MVA) capacity or above. In a facility, an electric utility substation down converts utility power to generate substation power that is supplied to the UPS, which conditions the substation power. The UPS has a source of back-up power that provides power in the event of an interruption in the utility power.

Referring now to FIG. 1, a power distribution system 10 that includes a high power UPS 12 is shown. The power distribution system 10 includes a utility substation 14 that includes a utility transformer that down converts (steps down) a utility voltage (e.g. 12 kilovolts alternating current (KVAC) to 34.5 KVAC) to a substation voltage (e.g. 480 VAC). The UPS 12 provides uninterruptible power with a load voltage (e.g. 480 VAC) to a load 15.

The UPS 12 includes an input transformer 16, a rectifier 18, an inverter 20 and an output transformer 22. The input transformer 16 may include a primary winding and a secondary winding. The primary winding receives the substation voltage. It should be understood that the primary winding and the secondary winding may include a plurality of individual windings. For example, in a three-phase system, the primary winding may illustratively be "wye" configured winding" having a winding for each phase and the secondary winding may also be a "wye" configured winding having a winding for each phase. The secondary winding is connected to the rectifier 18 that converts the substation voltage to a first direct current (DC) voltage (e.g. 540 VDC). The inverter 20 receives the first DC voltage and/or a second DC voltage from a DC back-up power source 24.

The inverter 20 converts a DC voltage received from the rectifier 18 or from the DC back-up power source 24 to an AC voltage (e.g. 250V AC) that is supplied to the output transformer 22. The output transformer 22 includes primary and secondary windings, which up convert (boost) the AC voltage to an output voltage (e.g. 480 VAC) that is provided to the load 15. The output transformer 22 is fully rated, as approximately 100% of the current that is provided from the inverter 20 passes through windings of the output transformers 22.

The UPS 12 may include a bypass switch 25, which may be used to bypass the input transformer 16, the rectifier 18, the inverter 20, and the output transformer 22 and provide bypass power to the load 15. The bypass power may be provided through the bypass switch 25 and may be the power from the utility substation 14.

SUMMARY

In one embodiment, a high power uninterruptible power supply is provided that includes an isolation transformer. The isolation transformer includes a primary winding and a plurality of secondary windings. A rectifier is coupled to each of the secondary windings. The primary winding receives a first alternating current voltage from a utility substation. Each of the secondary windings generates a second alternating current voltage which is converted by the respective rectifiers to a direct current voltage. An inverter having an input coupled to an output of each rectifier, converts the direct current voltage to a third alternating current voltage which is provided to output terminals of the high power uninterruptible power supply. A back-up power source is coupled to an input of the inverter. A reference transformer is electrically coupled in parallel with the output terminals of the uninterruptible power supply and is configured to provide at least one of a neutral reference and a ground reference.

In an aspect, the inverter includes a plurality of inverters. In an aspect, the inverter includes an inverter for each rectifier with an input of each inverter coupled to an output of a respective one of the rectifiers.

In an aspect, an output of the inverter is coupled through a filter to the output terminals of the uninterruptible power supply.

In an aspect, an amplitude of the second alternating current voltage than an amplitude of the first alternating current voltage. In an aspect, an amplitude of the third alternating current is less than the amplitude of the first alternating current voltage.

In an aspect, the isolation transformer includes a plurality of secondary windings and the rectifier includes a rectifier for each secondary winding having an input coupled to that secondary winding. The rectifiers are phase shafted with respect to each other to reduce total harmonic distortion.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
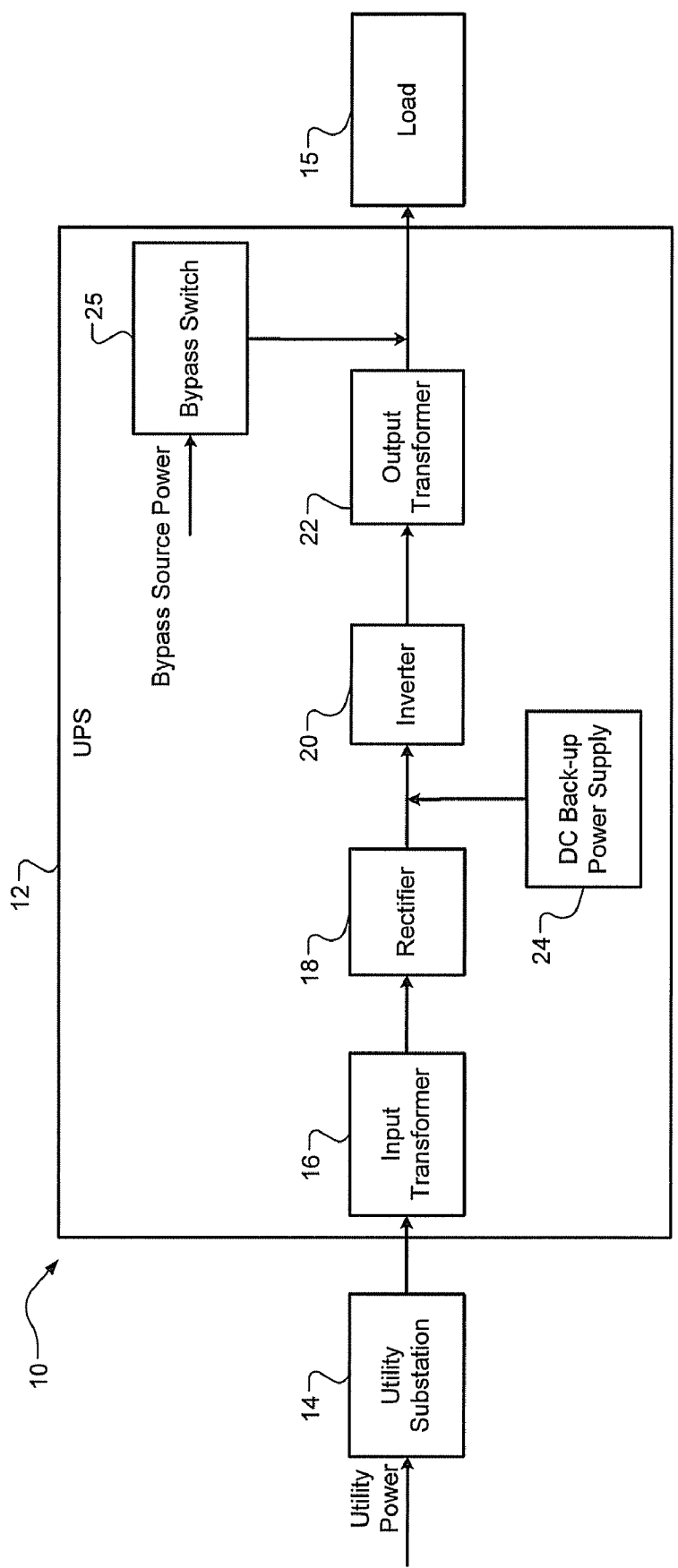
FIG. 1 is a functional block diagram of a prior art power distribution system that includes an uninterruptible power supply (UPS)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, in the following description terms, such as "first", "second", and "third" are used. These terms are not specific to any one device, voltage, current, etc. More than one of the terms may be used to refer to the same device, voltage, current, etc. depending upon the context.

In addition, in the following description various variable labels are disclosed. The variable labels are provided as examples only. The variable labels are arbitrarily provided and may each be used to identify or refer to different items. For example, the variable label X may be used to refer to a number of back-up power supplies or to a number of inverters of an uninterruptible power supply (UPS).

Also, in the following description various voltages are disclosed. These voltages are provided as examples. The embodiments disclosed herein may be applied to different voltage levels and are not limited to the exemplary voltages disclosed.

Figure 2:
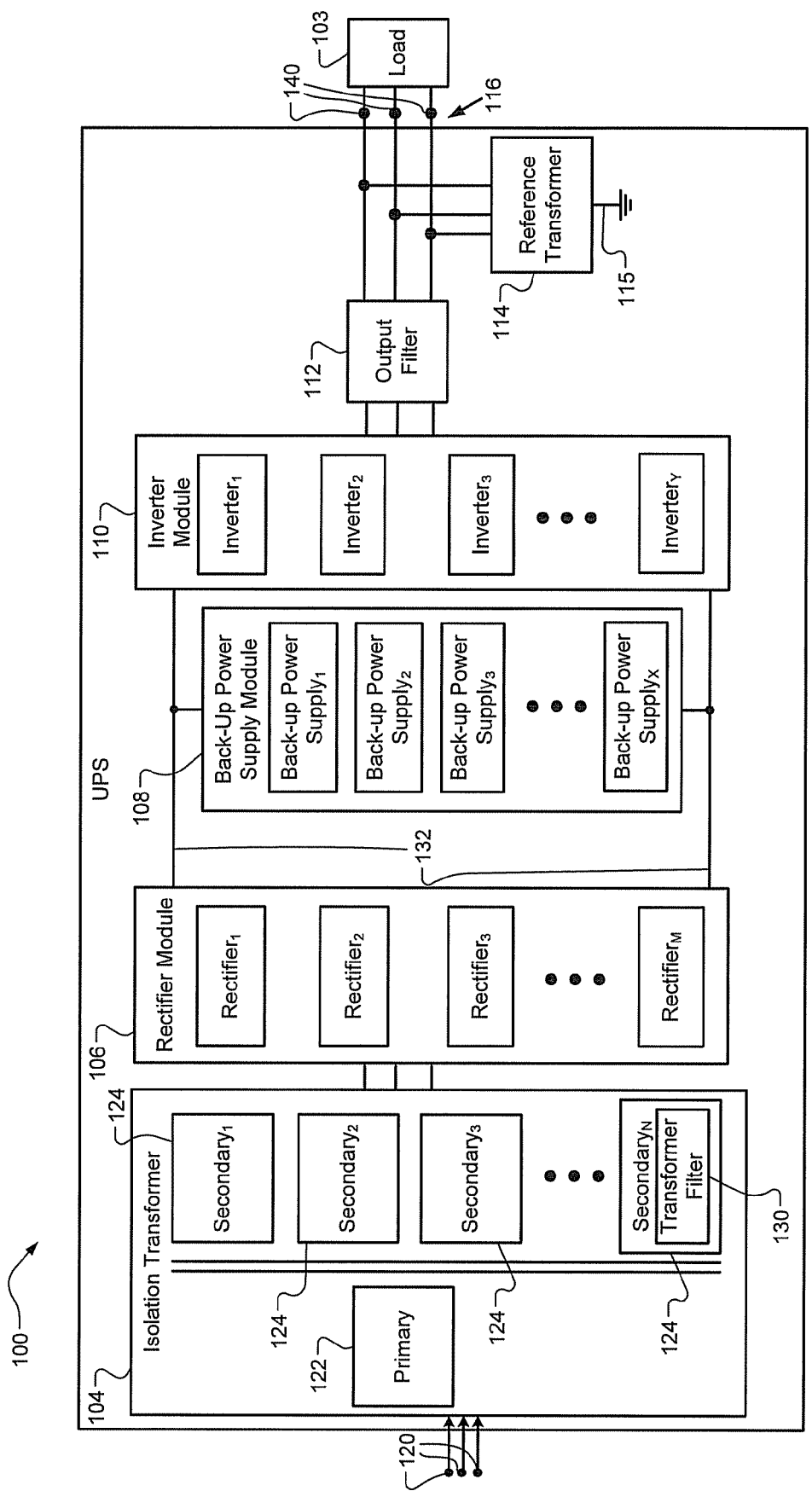
FIG. 2 is a functional block diagram of a power distribution system that includes a UPS in accordance with an embodiment of the present disclosure.

Referring now to FIG. 2, a power distribution system 100 having a high power UPS 102 in accordance with an aspect of the present disclosure is shown. As used herein, a high power "UPS means a UPS that has a one mega-volt-amp (MVA) capacity or above. The MVA rating of a UPS may be related to the number of rectifiers incorporated in the UPS. For example, a one MVA UPS may have one rectifier, a two MVA UPS may have two rectifiers, a three MVA UPS may have three rectifiers, etc. The power distribution system 100 includes one or more of the UPS 102 and one or more load(s) 103 of a facility. A single UPS may supply power to multiple loads.

The UPS 102 includes an isolation transformer 104, a rectifier module 106 with one or more rectifier(s)$_{1-M}$, a back-up power supply module 108 with one or more back-up power supply(ies)$_{1-X}$, and an inverter module 110 with one or more inverter(s)$_{1-Y}$, an output filter 112 and a reference transformer 114. M, X, and Y are integers. The rectifiers$_{1-M}$ and the inverters$_{1-Y}$ may be incorporated into a single module, may be incorporated into single rectifier and inverter modules or may be separately packaged. Each of the rectifiers$_{1-M}$ may be separately packaged with a respective one of the inverters$_{1-Y}$. For example, the first rectifer$_1$ and the first inverter$_1$ may be incorporated into a first module. The second rectifer$_2$ and the second inverter$_2$ may be incorporated into a second module. The rectifiers and inverters may be separately packaged.

The isolation transformer 104 may directly receive utility power with a utility voltage (first AC voltage) of, for example, three-phase approximately 12-34.5 KVAC on input terminals 120. The utility voltage has a first voltage amplitude. A high utility voltage may refer to a voltage that is greater than or equal to approximately 10 KVAC. The isolation transformer 104 down converts the utility voltage to one or more transformer supply voltage(s) (second AC voltage(s)) with second voltage amplitude(s), such as three-phase approximately 690 VAC. The transformer supply voltage(s) are the output voltages respectively of each secondary winding of the isolation transformer 104. The second voltage amplitude(s) are less than the first voltage amplitude.

The isolation transformer 104 may include a primary winding 122 and a plurality of secondary windings 124. As mentioned above, it should be understood that the primary winding and each secondary winding may include a plurality of windings, such as three windings each in a three-phase system. The secondary windings 124 are out-of-phase with each other. Examples of out-of-phase secondary windings are shown in FIGS. 3-6. The use of out-of-phase secondary windings reduces harmonics and provides, for example, a 60 Hz waveform.

The isolation transformer 104 cancels certain harmonics based on the number of secondary windings 124 and the out-of-phase relationship between the secondary windings 124. The isolation transformer 104 may optionally include one or more filters with the secondary windings 124. The filters may perform as low-pass filters and/or filter out harmonics that are not cancelled out by at least one of the primary winding 122 and the others of the secondary windings 124. For example, only one of the secondary windings 124, as shown, may include a transformer filter 130.

The rectifiers$_{1-M}$ convert the transformer supply voltage(s) from the isolation transformer 104 to a primary DC bus voltage (e.g. 750-800 VDC), which is provided to a DC bus 132. The amplitude of the primary DC bus voltage may be greater than the amplitude(s) of the transformer supply voltage(s). In an aspect, the number of the rectifiers is equal to the number of the secondary windings, with an input of each rectifier coupled to a respective one of the secondary windings.

The back-up power supplies$_{1-X}$ may provide a secondary (or backup) DC bus voltage to the DC bus 132 when certain conditions exist. For example, the secondary DC voltage (e.g. 750-800 VDC) may be provided to the DC bus 132 when: the utility power is not within a predetermined range of a set level; one of the devices of the UPS 12, such as the isolation transformer 104 or one of the rectifiers$_{1-M}$, is operating improperly; there is a power outage (the utility power is not received by the isolation transformer 104); etc. Although multiple back-up power supplies$_{1-X}$ are shown, a single back-up power supply may be used. The number of back-up power supplies may be equal to the number of inverters. Each of the back-up power supplies$_{1-X}$ may include any of a battery bank, a flywheel, a fuel cell, a generator, etc.

The inverters$_{1-Y}$ convert the DC bus voltage on the DC bus 132 to a three-phase AC load voltage (third AC voltage) with a third voltage amplitude (e.g. 480 VAC). The third voltage amplitude is less than the first voltage amplitude and may be less than the amplitude of the DC bus voltage of the DC bus 132 and/or the second voltage amplitude. For a one MVA UPS, the voltage and the peak current out of the inverters$_{1-Y}$ may be approximately 480 VAC and approximately 2000 Amps (A) (for a four inverter UPS, 500 A per inverter). The AC load voltage is filtered by the output filter 112 and provided to the reference transformer 114 and outputted to load 103 at output terminals 140. The reference transformer 114 introduces a neutral or ground reference 115 to the output 116 of the UPS 102. The number of inverters may be greater than, equal to, or less than the number of rectifiers.

The reference transformer 114 is partially-rated and is connected in parallel with output terminals 140 of the UPS 102. As the reference transformer 114 is connected in parallel, only a portion (e.g. less than 20%) of the current output of UPS 102 need flow through reference transformer 114. Since only a portion of the current output of UPS 102 need flow through reference transformer 114, the reference transformer 114 may be partially-rated. In other words, the power or current rating (capacity) of the reference transformer 114 may be less than a transformer through which 100% of the current output of UPS 102 flows. Since only a portion of the current output of UPS 102 flows through e transformer 114 receives a reduced amount of current, it may be smaller in size. In one embodiment, the reference transformer 114 receives approximately 10%-20% of the rated capacity of a corresponding UPS system.

The reference transformer 114 does not perform a voltage up conversion or a voltage down conversion to provide the load voltage. The reference transformer 114 may be, for example, a zig-zag transformer, examples of which are shown in FIGS. 3-6. The load voltage is less than the output voltage of the isolation transformer 104 by a predetermined voltage. This eliminates the need to step up the output voltage of the inverters 110 or the output filter 112 to provide the load voltage.

Since the power distribution system 10 in an illustrative embodiment does not include a utility substation and/or a utility transformer, the number of system devices is reduced. Also, the amount of cabling, switching gear, and other power distribution devices that are often used to distribute power between a utility substation and a UPS are not needed. The non-use of the power distribution devices reduces system losses, such as thermal losses, and saves energy. Power savings is further increased for a system with multiple UPSs, such as the system disclosed in FIG. 7.

Figure 3A:
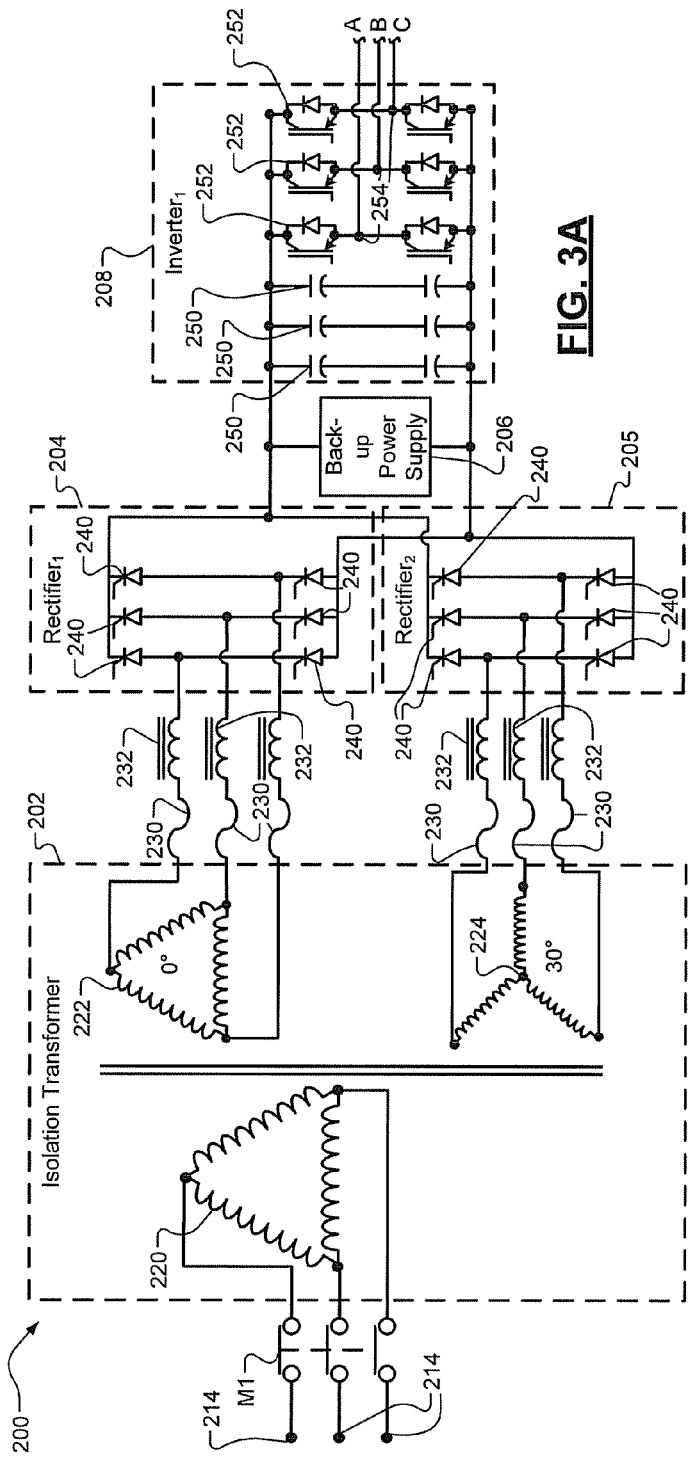
FIGS. 3A and 3B is a schematic view of an exemplary twelve pulse UPS in accordance with an embodiment of the present disclosure.
Figure 3B:
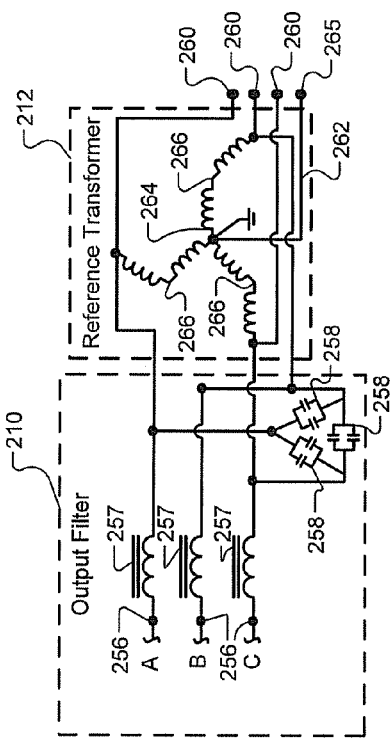

Referring now to FIGS. 3A and 3B, a schematic view of an exemplary twelve pulse (two rectifier) UPS 200 is shown. The UPS 200 includes an isolation transformer 202, rectifiers 204, 205, a back-up power supply 206, an inverter 208, an output filter 210, and a reference transformer 212.

The isolation transformer 202 receives utility power via input terminals 214. An isolation transformer is a transformer where a secondary winding (or windings) is isolated from a primary winding of the transformer. The utility power may be selectively provided to the isolation transformer 202 via a switch Ml. The isolation transformer 202 includes a primary winding 220 and secondary windings 222, 224. The secondary windings 222, 224 provide a transformer supply power to the rectifiers 204, 205. The secondary windings 222, 224, as shown, are thirty degrees out-of-phase from each other. For example only, the first secondary winding 222 is a triangular 0° winding and the second secondary winding 224 is a wye 30° winding.

Total harmonic distortion (THD) is reduced by shifting the phase of the two rectifiers 204, 205 with respect to each other by thirty degrees. In a six pulse (single rectifier) UPS the $5^{th}$ and $7^{th}$ harmonics of received power are predominant. In a twelve pulse UPS, the $5^{th}$ and $7^{th}$ harmonics are canceled. This reduces the input current THD from 20-35% (six pulse UPS) to 10-13% (twelve pulse UPS).

Fuses 230 and inductors 232 may be connected in series and in fuse/inductor pairs for each of three phase lines extending between the secondary windings 222, 224 and the rectifiers 204, 205. The inductors 232 may be used to smooth transformer supply current and/or to reduce harmonics.

The rectifiers 204, 205 are out-of-phase with each other due to the out-of-phase configuration of the secondary windings 222, 224. As shown, the first rectifier 204 is 30° out-of-phase from the second rectifier 205. Each of the rectifiers 204, 205, may include six power switches 240 (two for each pulse). The power switches may be thyristors, such as silicon controlled rectifiers (SCRs). UPS's may be characterized as six, twelve, eighteen, twenty-four, etc. pulse systems, with the pulses being the pulses applied to the switching inputs of power switches, such as the gates of the power switches 240. As twelve power switches are incorporated in the UPS 200, the UPS 200 is a twelve pulse power supply.

The six power switches 240 of each of the rectifiers 204, 205 are connected in two parallel sets of three power switches, where each of the parallel sets are associated with a single phase and connected to a respective one of the inductors 232. The cathodes of a first one of the two parallel sets are connected to a first terminal of a DC bus. The anodes of the first one of the two parallel sets are connected to respective ones of the inductors 232. The anodes of the second one of the two parallel sets are connected to a second terminal 244 of the DC bus. The cathodes of the second one of the two parallel sets are connected to the respective anodes of the first one of the two parallel sets and to respective ones of the inductors 232. The DC bus terminals 242, 244 are connected in parallel to the back-up power supply 206.

The inverter 208, as shown, includes three pairs of serially connected capacitors 250 and three pairs of serially connected insulated gate bipolar transistors (IGBTs) 252. The capacitor pairs 250 are connected in parallel with each other and with the DC bus terminals 242, 244. Each pair of the IGBT pairs 252 are connected in parallel with each other and with the DC bus terminals 242, 244. The IGBT pairs 252 may be switched ON and OFF in a controlled manner at high rates, such as at a rate of approximately 2.5-3.0 KHz. Three-phase inverter output terminals 254 are provided between IGBTs of each of the IGBT pairs 252.

The inverter output terminals 254 are connected to filter input terminals 256 of the output filter 210. The output filter 210 includes three inductors 260 that are connected in series between the inverter 208 and the reference transformer 212. The inductors 257 are each associated with a single phase. Three capacitor pairs 258 are connected between each of the output phases of the inductors 257. Each of the capacitor pairs 258 include capacitors that are connected to each other in parallel. The output filter 210 may perform as a low pass filter and remove the switching frequency induced by the IGBT pairs 252. For example, when the IGBT pairs 252 are switched ON and OFF at a frequency of 2.7 KHz, the output filter 210 may remove the 2.7 KHz frequency from the AC signal received from the inverter 208. The AC signal provided to the reference transformer 212 may be a 60 Hz signal with frequencies above a predetermined frequency (cutoff frequency of the output filter 210) removed.

The reference transformer 212 may be a zig-zag transformer as shown. The reference transformer 212 is connected in parallel with the inductors 257 and output terminals 260 of the UPS 200. The output terminals 260 are included as part of a four wire output of the UPS 200. The fourth wire 262 is associated with a center reference terminal 264 of the reference transformer 212 and a fourth output terminal 265. The connecting arrangement of the reference transformer 212 allows a majority of the current outputted by the output filter 210 to pass to the output terminals 260 without passing through windings of the reference transformer 212. The reference transformer 212 may have a wye configuration with the center reference terminal (junction) 264 connected between the three legs 266 of the transformer 212. Each of the legs 266 may have one or more windings.

The center reference terminal 264 may be connected to a neutral or ground reference, as shown. This grounds the transformer 208 and assures that the potentials of the output terminals 260 and the voltages between the output terminals 260 are at predetermined levels. For example, the voltages between the output terminals 260 may be approximately 480 VAC for a 480 VAC three-phase output with the voltages between terminals 260 and terminal 265 being approximately 277 VAC. When a fault condition arises, such as when one of the output terminals 260 is shorted to ground, an increased level of current may pass through one of the legs 266 to ground. This minimizes damage to components of the UPS 200.

Figure 4A:
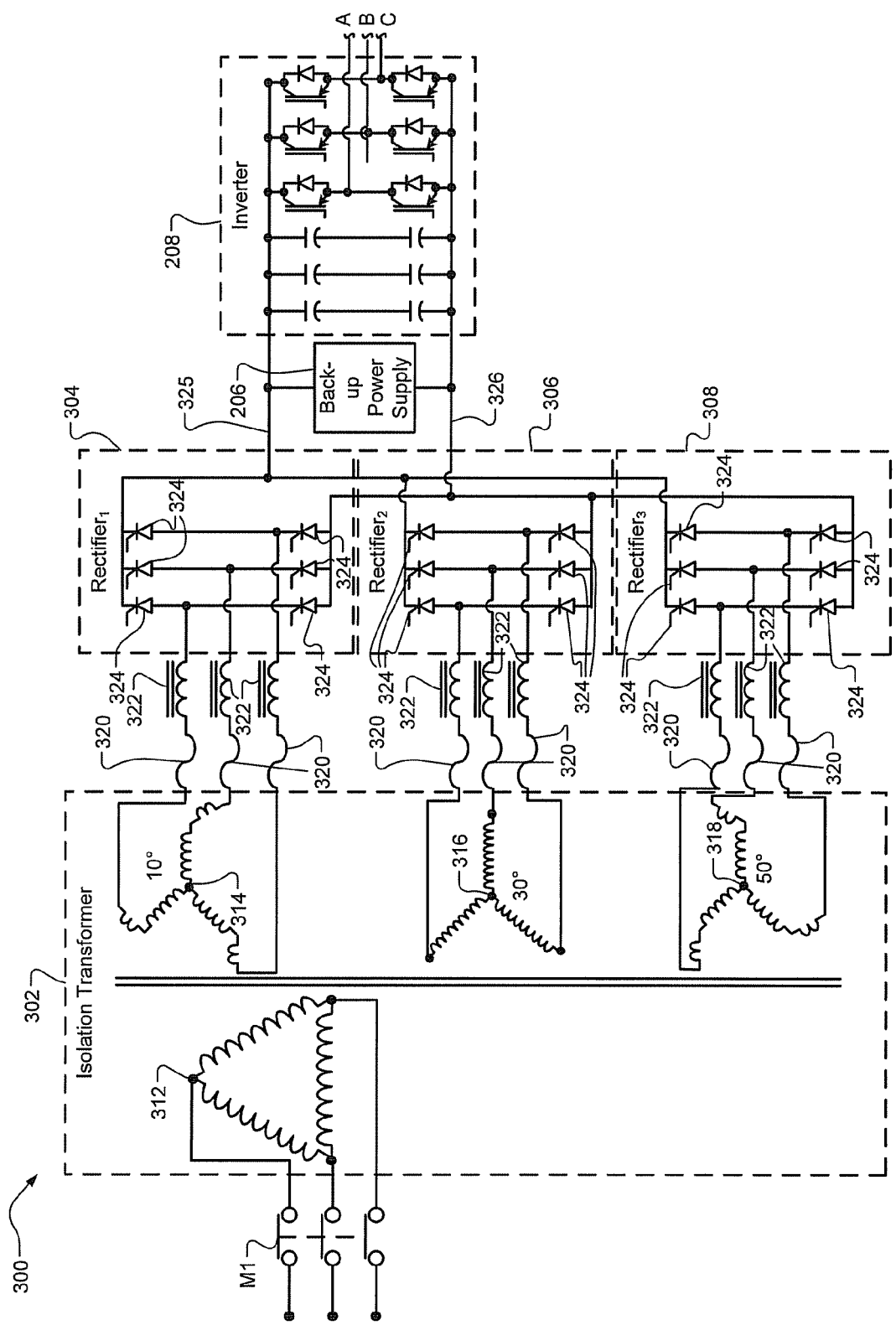
FIGS. 4A and 4B is a schematic view of an exemplary eighteen pulse UPS in accordance with an embodiment of the present disclosure.
Figure 4B:
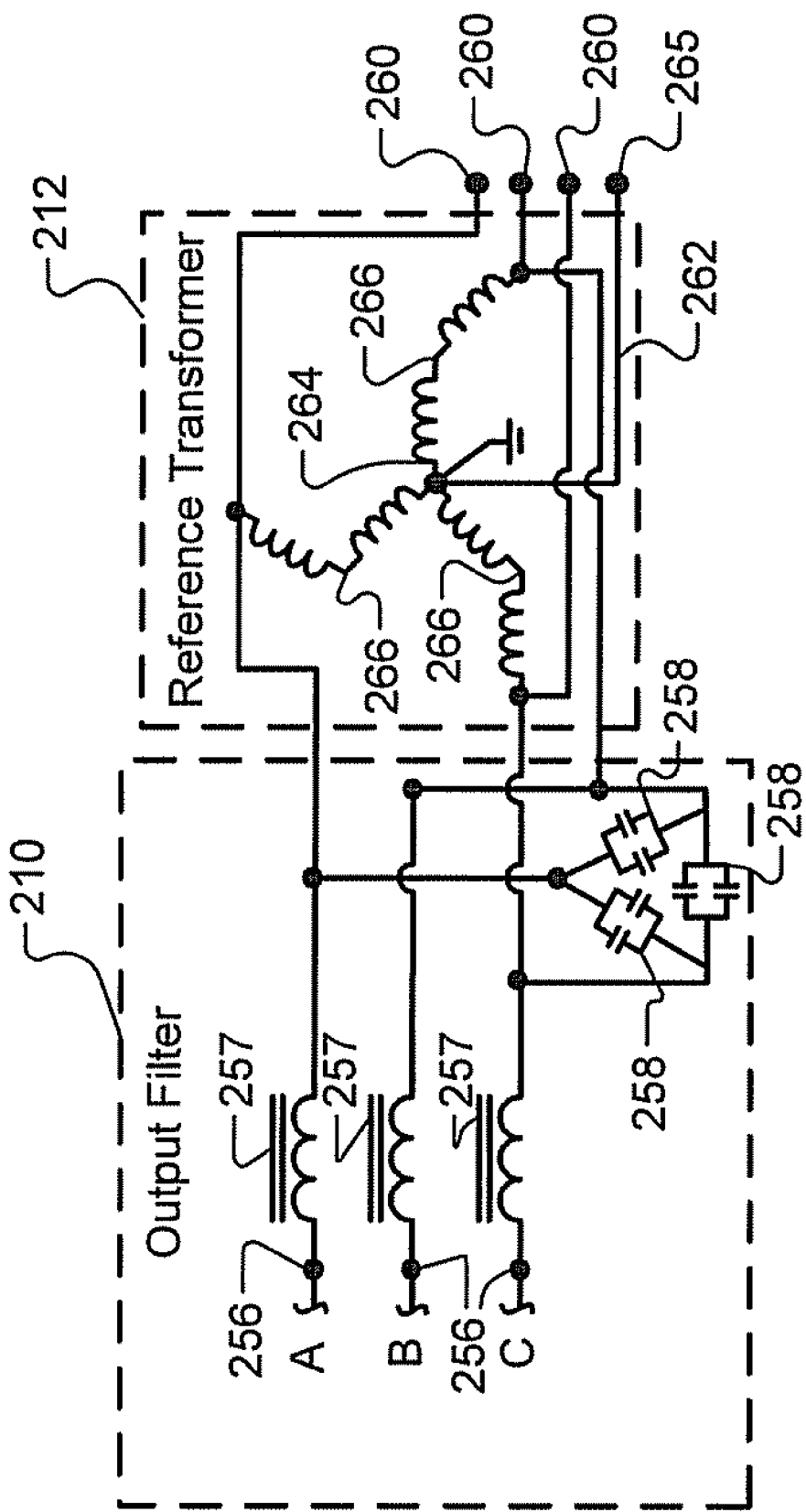

Referring now to FIGS. 4A and 4B, a schematic view of an exemplary eighteen pulse (three rectifier) UPS 300 is shown. Elements that are in common with the elements of the UPS 200 of FIGS. 3A and 3B are identified with the same reference numbers.

The UPS 300 includes an isolation transformer 302, three rectifiers 304, 306, 308, the inverter 208, the output filter 210 and the reference transformer 212. The isolation transformer 302 includes a primary winding 312 and three secondary windings 314, 316, 318. The secondary windings 314, 316, 318 are out-of phase with each other. For the example embodiment shown, the secondary windings 314, 316, 318 include a wye 10° winding, a wye 30° winding, and a wye 50° winding. Fuses 320 and inductors 322 are connected between respective legs of the secondary windings 314, 316, 318 of the isolation transformer 302 and the rectifiers 304, 306, 308.

The rectifiers 304, 306, 308 include respective power switches 324 (e.g. six power switches per rectifier). The power switches 324 of each of the rectifiers 304, 306, 308 are connected in two parallel sets of three power switches, where each of the parallel sets are associated with a single phase and connected to a respective one of the inductors 322. The cathodes of a first one of the two parallel sets are connected to a first leg 325 of a DC bus, which may have respective terminals. The anodes of the first one of the two parallel sets are connected to respective ones of the inductors 322. The anodes of the second one of the two parallel sets are connected to a second leg 326 of the DC bus. The cathodes of the second one of the two parallel sets are connected to the respective anodes of the first one of the two parallel sets and to respective ones of the inductors 322.

The second rectifier 306 is phase shifted by twenty degrees from each of the first and the third rectifiers 304, 308. The third rectifier 308 is phase shifted forty degrees from the first rectifier 304. The UPS 300 has an input current THD of approximately 7%-10%. Since the UPS 300 is an eighteen pulse system with three out-of-phase rectifiers, the $5^{th}$, $7^{th}$, $11^{th}$ and $13^{th}$ harmonics are canceled. The predominant remaining harmonics are the $17^{th}$ and $19^{th}$ harmonics, which have amplitudes that are less than the amplitudes of the, for example, $11^{th}$ and $13^{th}$ harmonics of the UPS 200 of FIGS. 3A and 3B.

Figure 5A:
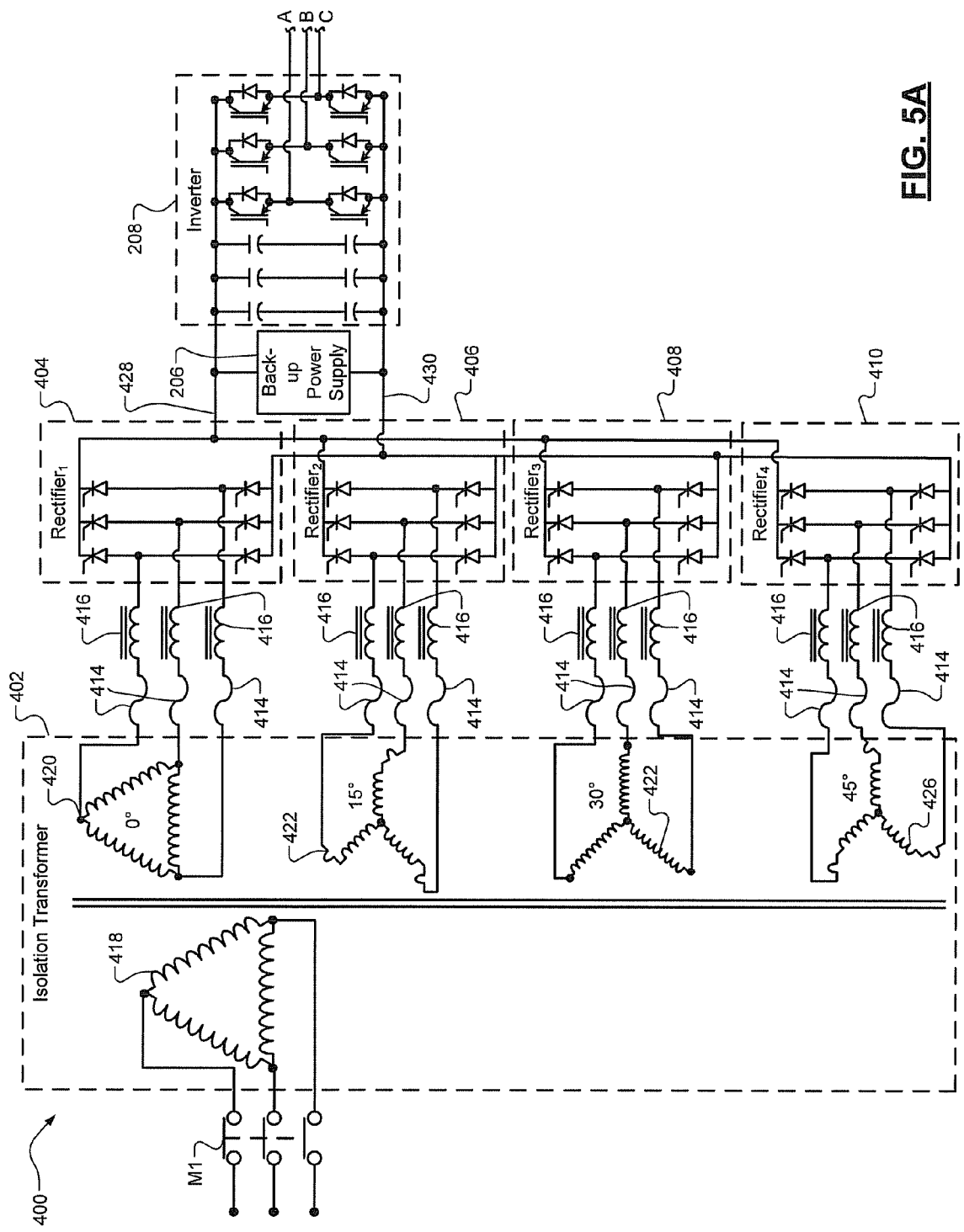
FIGS. 5A and 5B is a schematic view of an exemplary twenty-four pulse UPS in accordance with an embodiment of the present disclosure.
Figure 5B:
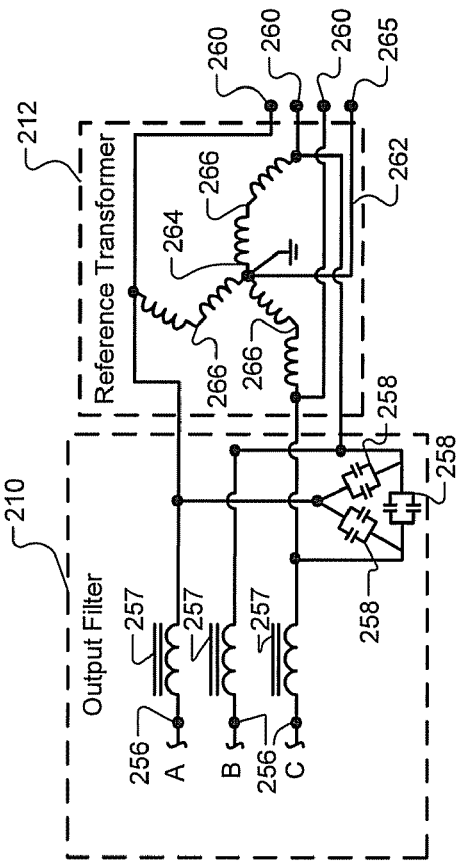

Referring now to FIGS. 5A and 5B, a schematic view of an exemplary twenty-four pulse UPS 400 is shown. Elements that are in common with the elements of the UPS 200 of FIGS. 3A and 3B are identified with the same reference numbers.

The UPS 400 includes an isolation transformer 402, four rectifiers 404, 406, 408, 410, the inverter 208, the output filter 210 and the reference transformer 212. Fuses 414 and inductors 416 are connected between respective legs of the secondary windings of the isolation transformer 402 and the rectifiers 404-410. The isolation transformer 402 includes a primary winding 418 and four secondary windings 420, 422, 424, 426. The secondary windings 420-426 are out-of phase with each other. For the example embodiment shown, the secondary windings 420-426 include a triangular 0° winding, a wye 15° winding, a wye 30° winding, and a wye 45° winding.

The rectifiers 404, 406, 408, 410 include respective power switches (e.g. six power switches per rectifier). The power switches of each of the rectifiers 404, 406, 408, 410 are connected in two parallel sets of three power switches, where each of the parallel sets are associated with a single phase and connected to a respective one of the inductors 416. The cathodes of a first one of the two parallel sets are connected to a first leg 428 of a DC bus, which may have respective terminals. The anodes of the first one of the two parallel sets are connected to respective ones of the inductors 416. The anodes of the second one of the two parallel sets are connected to a second leg 430 of the DC bus. The cathodes of the second one of the two parallel sets are connected to the respective anodes of the first one of the two parallel sets and to respective ones of the inductors 416.

The second rectifier 406 is phase shifted by 15° from each of the first and the third rectifiers 404, 408 and by 45° from the fourth rectifier 410. The third rectifier 408 is phase shifted by 150 from the fourth rectifier 410 and by 30° from the first rectifier 404. The UPS 400 has an input current THD of approximately 5%-7%. The $5^{th}$, $7^{th}$, $11^{th}$, $13^{th}$, $17^{th}$ and $19^{th}$ harmonics are canceled. The predominant remaining harmonics are the $23^{rd}$ and $25^{th}$, which have amplitudes that are less than amplitudes of the, for example, $17^{th}$ and $19^{th}$ harmonics of the UPS 300 of FIGS. 4A and 4B.

Figure 6B:
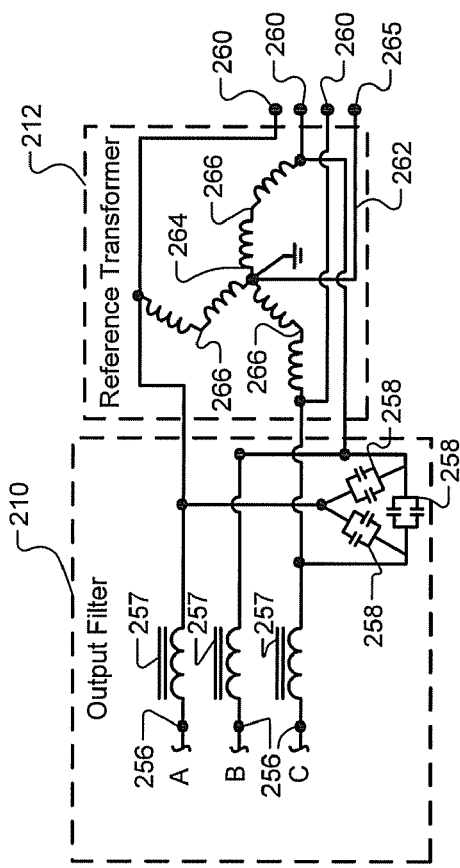
FIGS. 6A and 6B is a schematic view of an UPS incorporating multiple inverters in accordance with an embodiment of the present disclosure.
Figure 6A:
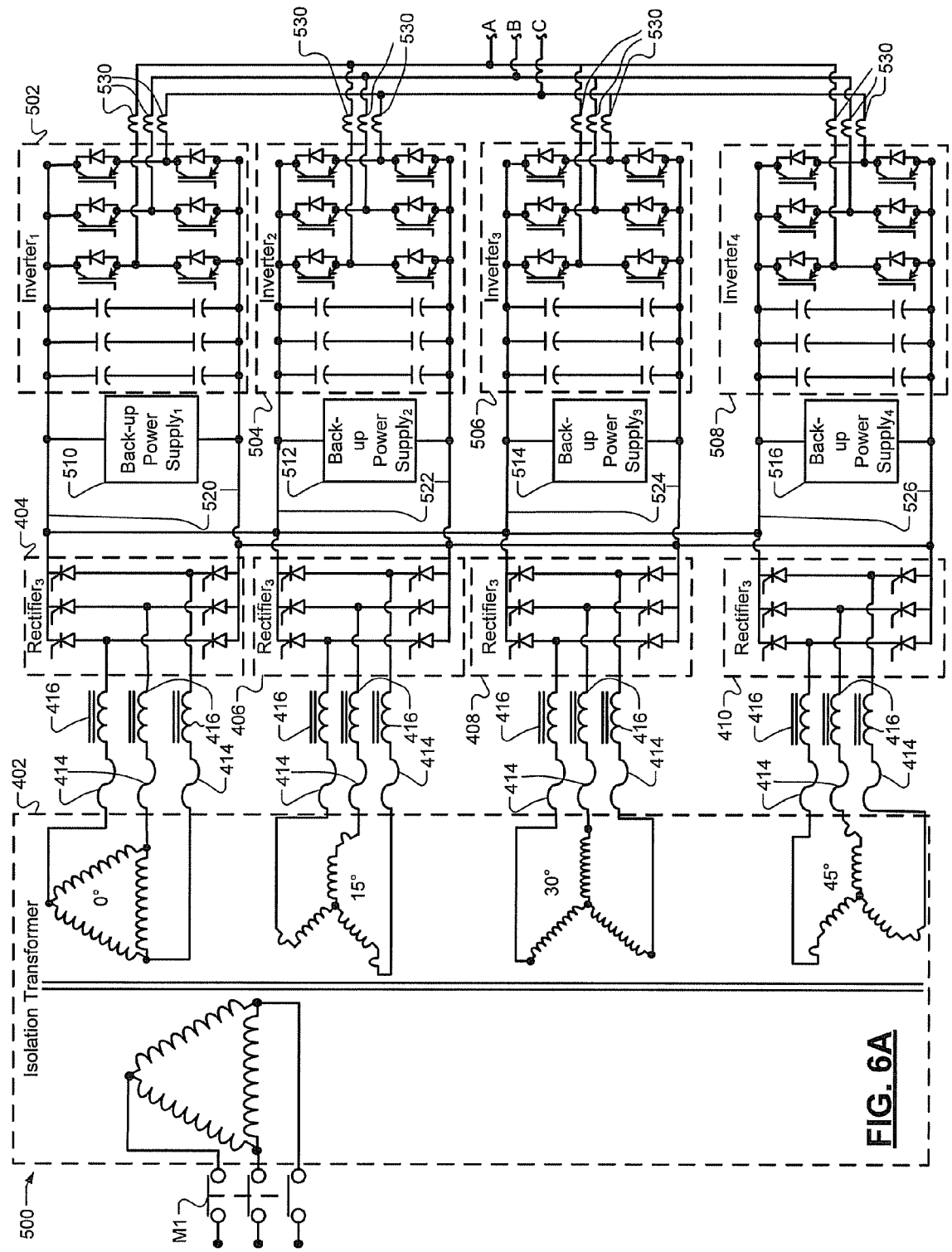

Referring now to FIGS. 6A and 6B, a twenty-four pulse (four rectifier) UPS 500 incorporating multiple inverters is shown. Elements that are in common with the elements of the UPS system 400 of FIGS. 5A and 5B are identified with the same reference numbers.

The UPS 500 includes the isolation transformer 402, four rectifiers 404-410, four inverters 502-508, the output filter 210 and the reference transformer 212. Four back-up power supplies 510-516 are connected to respective DC buses 520-526 of the inverters 502-508. Inductors 530 may be connected between the output terminals of the inverters 502-508 and the input terminals 256 of the output filter 210.

The inclusion of the four inverters 502-508 allows for increased capacity, allows for a reduction in the capacity of individual inverters, and allows for smaller components to be used. The use of multiple smaller inverters, as opposed to fewer larger inverters, allows for easier maintenance or repair of inverters. A maximum number of inverters may be determined to minimize the number of components and system complexity. The output filter may be adjusted depending upon the number of inverters. For example, the capacity and/or the frequency cutoff of the filter may be adjusted.

Figure 7:
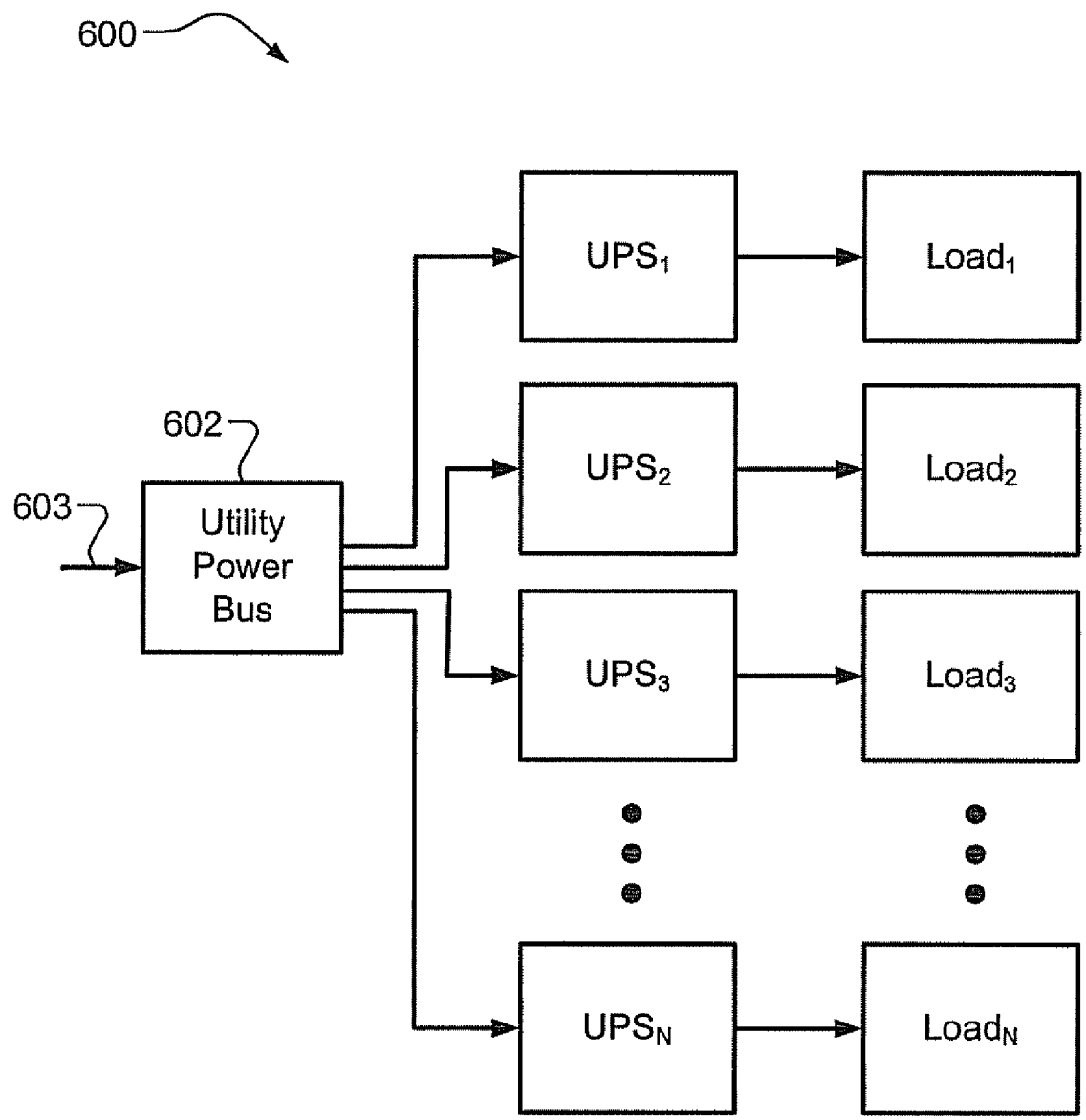
FIG. 7 is a functional block diagram of a UPS system in accordance with an embodiment of the present disclosure.

Referring now to FIG. 7, a UPS system 600 is shown. The UPS system 600 includes a utility power bus 602 that receives and provides utility power 603 to multiple $UPSs_{1-N}$. The $UPSs_{1-N}$ provide power to respective $loads_{1-M}$, where N and M are integers and M may be greater than or equal to N. Each of the $UPSs_{1-N}$ may be one of the types disclosed in FIGS. 2-6.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A higher power uninterruptible power supply comprising:
   an isolation transformer that comprises:
      a primary winding that receives a first alternating current voltage; and
      a secondary winding that generates a second alternating current voltage;
   a rectifier coupled to the secondary winding that converts the secondary alternating current voltage to a direct current voltage that is provided to a primary direct current bus;
   an inverter having an input coupled to the primary direct current bus that converts the direct current voltage to a third alternating current voltage that is coupled to an output of the high power uninterruptible power supply;
   a back-up power source coupled to the primary direct current bus; and
   a partially rated reference transformer that is electrically coupled in parallel with the output of the high power uninterruptible power supply and that is configured to provide at least one of a neutral reference and a ground reference;
   wherein the UPS has a rating of at least one MVA.

2. The apparatus of claim 1 wherein the third alternating current voltage has a voltage amplitude that is less than a voltage amplitude of the second alternating current voltage.

3. The apparatus of claim 1 wherein the third alternating current voltage has a voltage amplitude that is less than a voltage amplitude of the direct current voltage.

4. The apparatus of claim 1 wherein the reference transformer includes a center terminal that is connected to at least one of a neutral reference terminal and a ground terminal.

5. The apparatus of claim 1 wherein the reference transformer is a zig-zag transformer.

6. The apparatus of claim 1 wherein the reference transformer is rated for less than 20% of a maximum rated output current of the power supply.

7. The apparatus of claim 1 wherein the isolation transformer includes a plurality of secondary windings and the rectifier including a rectifier for each secondary winding having an input coupled to that secondary winding, the rectifiers phase shafted with respect to each other to reduce total harmonic distortion.

8. The apparatus of claim 7 wherein the UPS is a twelve pulse UPS with the isolation transformer including two secondary windings and two rectifiers, each of the rectifiers including six power switches, the rectifiers phase shifted thirty degrees with respect to each other to cancel $5^{th}$ and $7^{th}$ harmonics.

9. The apparatus of claim 7 wherein the UPS is an eighteen pulse UPS with the isolation transformer including first, second and third secondary windings and first, second and third rectifiers, each of the rectifiers including six power switches, the second rectifier phase shifted twenty degrees with respect to the first and third rectifiers and the third rectifier phase shifted forty degrees with respect to the first rectifier to cancel $5^{th}$, $7^{th}$, $11^{th}$ and $13^{th}$ harmonics.

10. The apparatus of claim 7 wherein the UPS is a twenty-four pulse UPS with the isolation transformer including first, second, third and fourth secondary windings and first, second, third and fourth rectifiers, each of the rectifiers including six power switches, the second rectifier phase shifted fifteen degrees from the first and third rectifiers and forty degrees from the fourth rectifier, the third rectifier phase shifted phase shifted by fifteen degrees from the fourth rectifier and by thirty degrees from the first rectifier to cancel $5^{th}$, $7^{th}$, $11^{th}$, $13^{th}$, $17^{th}$ and $19^{th}$ harmonics.

11. The power supply of claim 1 further comprising a filter coupled between the inverter and the output terminals.

12. The power supply of claim 11 wherein the filter comprises:
   an inductor that is connected in series between the inverter and the output terminals; and
   a capacitor that is connected in parallel with two of the output terminals.

13. The power supply of claim 7 wherein at least one the secondary windings includes a filter that removes a harmonic that is not cancelled out by the out of phase relationship of the rectifiers.

* * * * *